(12) United States Patent
Weng et al.

(10) Patent No.: US 11,237,328 B1
(45) Date of Patent: Feb. 1, 2022

(54) OPTICAL MODE CONVERTER AND METHOD FOR MANUFACTURING THE SAME

(71) Applicant: NATIONAL SUN YAT-SEN UNIVERSITY, Kaohsiung (TW)

(72) Inventors: Chen-Yu Weng, Kaohsiung (TW); Yi-Jen Chiu, Kaohsiung (TW); Yang-Jeng Chen, Kaohsiung (TW); Rih-You Chen, Kaohsiung (TW); Chung-Wei Hsiao, Kaohsiung (TW); Wei Lin, Tainan (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/952,131

(22) Filed: Nov. 19, 2020

(30) Foreign Application Priority Data

Nov. 3, 2020 (TW) .................................. 109138274

(51) Int. Cl.
*G02B 6/14* (2006.01)
*G02B 6/13* (2006.01)

(52) U.S. Cl.
CPC .................. *G02B 6/14* (2013.01); *G02B 6/13* (2013.01)

(58) Field of Classification Search
None
See application file for complete search history.

(56) References Cited

U.S. PATENT DOCUMENTS

| | | | | |
|---|---|---|---|---|
| 5,357,122 A | * | 10/1994 | Okubora | G02B 6/43 257/432 |
| 5,966,478 A | * | 10/1999 | Marcuse | G02B 6/122 385/131 |
| 6,483,098 B1 | * | 11/2002 | Kato | G02B 6/4214 250/214.1 |
| 2006/0127009 A1 | * | 6/2006 | Rasras | G02B 6/12004 385/47 |
| 2006/0269190 A1 | * | 11/2006 | Kim | H01S 5/141 385/43 |
| 2014/0153605 A1 | * | 6/2014 | Arimoto | G02B 6/4206 372/50.11 |
| 2017/0054269 A1 | * | 2/2017 | Tamura | H01S 5/0261 |
| 2017/0207600 A1 | | 7/2017 | Klamkin et al. | |
| 2018/0294620 A1 | * | 10/2018 | Suzuki | G02B 6/4214 |
| 2020/0176949 A1 | * | 6/2020 | Gotoda | H01S 5/04256 |

* cited by examiner

*Primary Examiner* — Michael Stahl
(74) *Attorney, Agent, or Firm* — WPAT, PC

(57) ABSTRACT

An optical mode converter is disclosed. The optical mode converter includes a substrate and a luminescent layer on the substrate. The luminescent layer includes an optical waveguide and an inclined mirror at an end of the optical waveguide. A light signal passes through the optical waveguide and is reflected by the inclined mirror to penetrate into the substrate. A method for manufacturing the optical mode converter is also disclosed.

9 Claims, 5 Drawing Sheets

OPTICAL MODE CONVERTER AND METHOD FOR MANUFACTURING THE SAME

CROSS REFERENCE TO RELATED APPLICATION

The application claims the benefit of Taiwan application serial No. 109138274, filed on Nov. 3, 2020, and the entire contents of which are incorporated herein by reference.

BACKGROUND OF THE INVENTION

1. Field of the Invention

The present invention generally relates to an optical element and, more particularly, to an optical mode converter for transmitting light signals and performing optical coupling and a manufacturing method thereof.

2. Description of the Related Art

Integrated optics uses light to transmit information and perform computation. Compared with common electric signals, light signals have the advantages of large bandwidth, fast transmission and low loss. In addition, with the development of semiconductor process approaching the physical limit, it is difficult to further increase the density of transistors in an integrated circuit, which leads to a bottleneck in the technology of improving the efficiency of electric signal computation. Therefore, in addition to being applied to optical communication, integrated optical circuit is also expected to replace integrated circuit as a new computing processor technology. The integrated optical circuit can integrate various optical elements, such as coupler, beam splitter, dimmer, switch, etc. on a silicon chip through the existing semiconductor process, and use optical waveguide to transmit light instead of using metallic wire to conduct electricity.

The integration of the above mentioned integrated optical circuit on the silicon chip can be carried out with the well-developed silicon semiconductor process. However, although the material properties of silicon is capable of transmitting light, it cannot be used as a luminous element. Instead, III-V compound semiconductor must be integrated into the silicon chip. In addition, the heterogeneous integration between III-V semiconductor and silicon photonic waveguide affects the transmission and coupling of optical mode between the two materials. As shown in FIG. 1, the conventional optical coupling technology uses a gradual tapered waveguide to fabricate an optical mode converter on a heterogeneous integrated element, so that the refractive indices of the two materials match each other, thus achieving vertical coupling. Since the cross-section of the silicon waveguide is reduced as much as possible, and the end faces are reliably joined through the steps of cutting, grinding, polishing and precise alignment, which lead to difficult process and increased cost of the tapered waveguide, and the effect of optical coupling cannot be guaranteed.

In view of this, it is necessary to improve the conventional optical mode converter and the manufacturing method thereof.

SUMMARY OF THE INVENTION

In order to solve the above mentioned problems, it is an objective of the invention to provide an optical mode converter, which can improve the optical coupling effect and reduce the optical loss.

It is another objective of the invention to provide an optical mode converter, which can select optical wavelength and luminous intensity.

It is yet another objective of the invention to provide an optical mode converter, which can adjust the light incident angle to meet the coupling condition.

It is a further objective of the invention to provide a method for manufacturing the optical mode converter, which can reduce the process difficulty and reduce the production cost.

As used herein, the term "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

The optical mode converter of the invention includes a substrate and a luminescent layer on the substrate. The luminescent layer includes an optical waveguide and an inclined mirror at an end of the optical waveguide. A light signal passes through the optical waveguide and is reflected by the inclined mirror to penetrate into the substrate.

A method for manufacturing the optical mode converter of the invention includes forming a luminescent layer on a substrate, forming an optical waveguide on the luminescent layer and a notch in the optical waveguide by lithography and etching processes, filling the notch with a bonding material to form an inclined mirror at the notch, grinding and polishing the substrate to a transmittance thickness, and forming a metal electrode on the luminescent layer by vapor deposition. An included angle is formed between an inclined plane of the notch and a light transmission direction of the optical waveguide. A reflecting surface of the inclined mirror faces the substrate.

Accordingly, the optical mode converter and the manufacturing method thereof of the invention are carried out by forming the inclined mirror on the optical path. When the light signal moves to the inclined mirror, the light signal is reflected downward to the silicon waveguide to meet the coupling condition, thereby having the effect of enhancing the coupling effect and reducing light transmission loss. In addition, by controlling the angle of reflection through etching, precise processes such as cutting and calibration can be omitted, thereby having the effect of reducing the process difficulty and saving the production cost.

In an example, the luminescent layer is made of a III-V compound semiconductor material. A metal electrode is located on the luminescent layer, and the luminescent layer receives current through the metal electrode and generates the light signal. Thus, the luminescent layer can emit light of different wavelengths without the need for an external light source, having the effect of improving light transmission efficiency and selecting suitable wavelength.

In an example, the optical mode converter of the invention further includes a coupling element located on a surface of the substrate opposite to the luminescent layer, and the light signal penetrates into the coupling element after passing through the substrate. Thus, the light signal can meet the coupling condition, having the effect of stabilizing the optical waveguide mode.

In an example, the inclined mirror is a parabolic mirror. Thus, the light signal can diffuse or focus light after being reflected, having the effect of adjusting the intensity of the reflected light.

In an example, an included angle between the inclined mirror and the optical waveguide is 46 to 54 degrees. Thus, it can prevent the light from being vertically reflected on the inclined mirror, having the effect of anti-reflection and adjusting coupling condition.

In an example, a thickness of the substrate is 25 to 35 micrometers. Thus, when the light signal passes through the substrate, the heat dissipation and amplification mode can be increased, having the effect of improving durability and achieving coupling condition.

BRIEF DESCRIPTION OF THE DRAWINGS

The present invention will become clearer in light of the following detailed description of illustrative embodiments of this invention described in connection with the drawings.

DETAILED DESCRIPTION OF THE INVENTION

Figure 1:
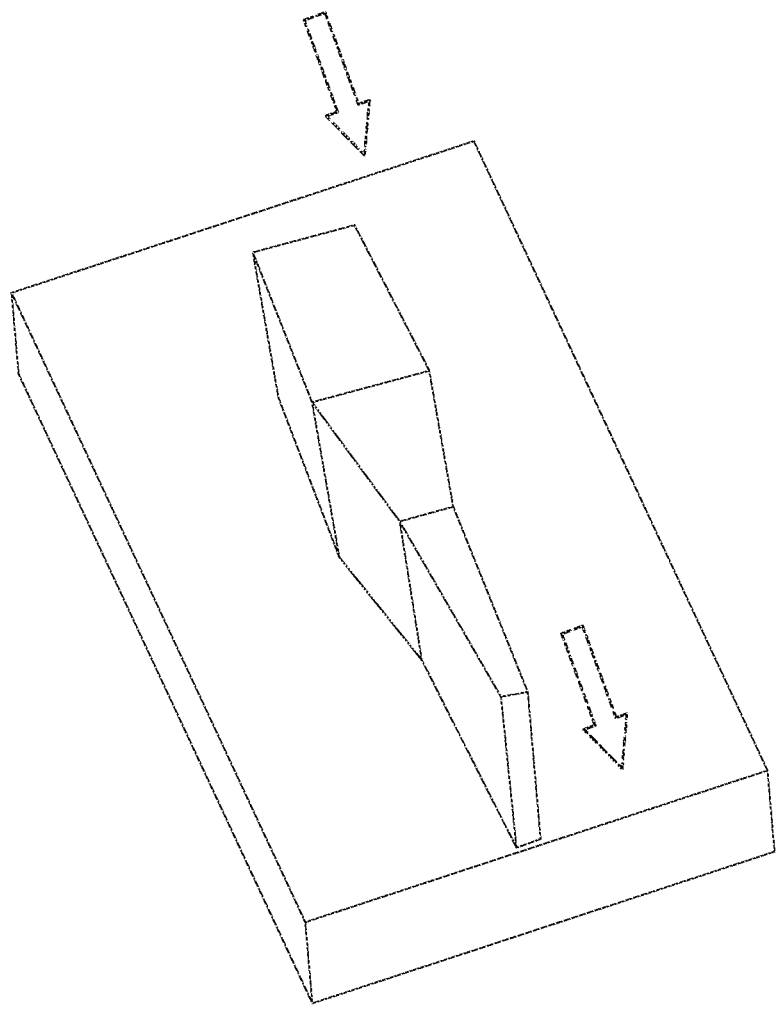
FIG. 1 is a configuration diagram of a conventional optical mode converter.
Figure 2:
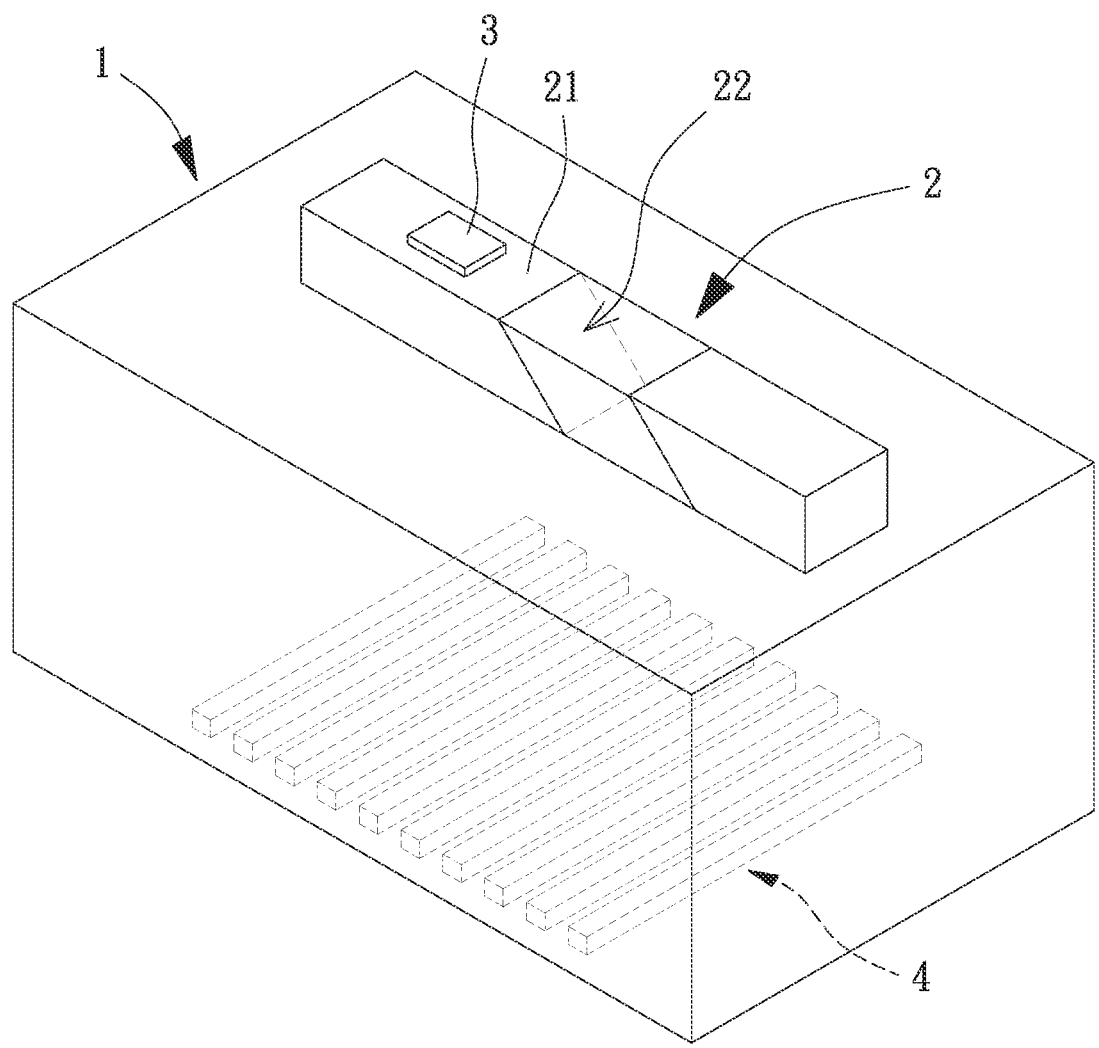
FIG. 2 is a perspective view of a preferred embodiment of the invention.

Please refer to FIG. 2, which is a preferred embodiment of an optical mode converter of the invention. The optical mode converter includes a substrate 1 and a luminescent layer 2. The luminescent layer 2 is located on the substrate 1 so that a light signal S penetrates into the substrate 1 from the luminescent layer 2.

The substrate 1 is used for carrying various optical elements, optical fibers, and luminous sources, and it permits materials such as metals and semiconductors to form thereon through a semiconductor process. The loss of light in the transmission process can be reduced by cutting, polishing and optical path calibration technologies. The existing optical elements such as grating, optical amplifier and beam splitter can also be directly adhered to the substrate 1. The substrate 1 can be silicon wafer, indium phosphide (InP) and other crystal materials.

Figure 3:
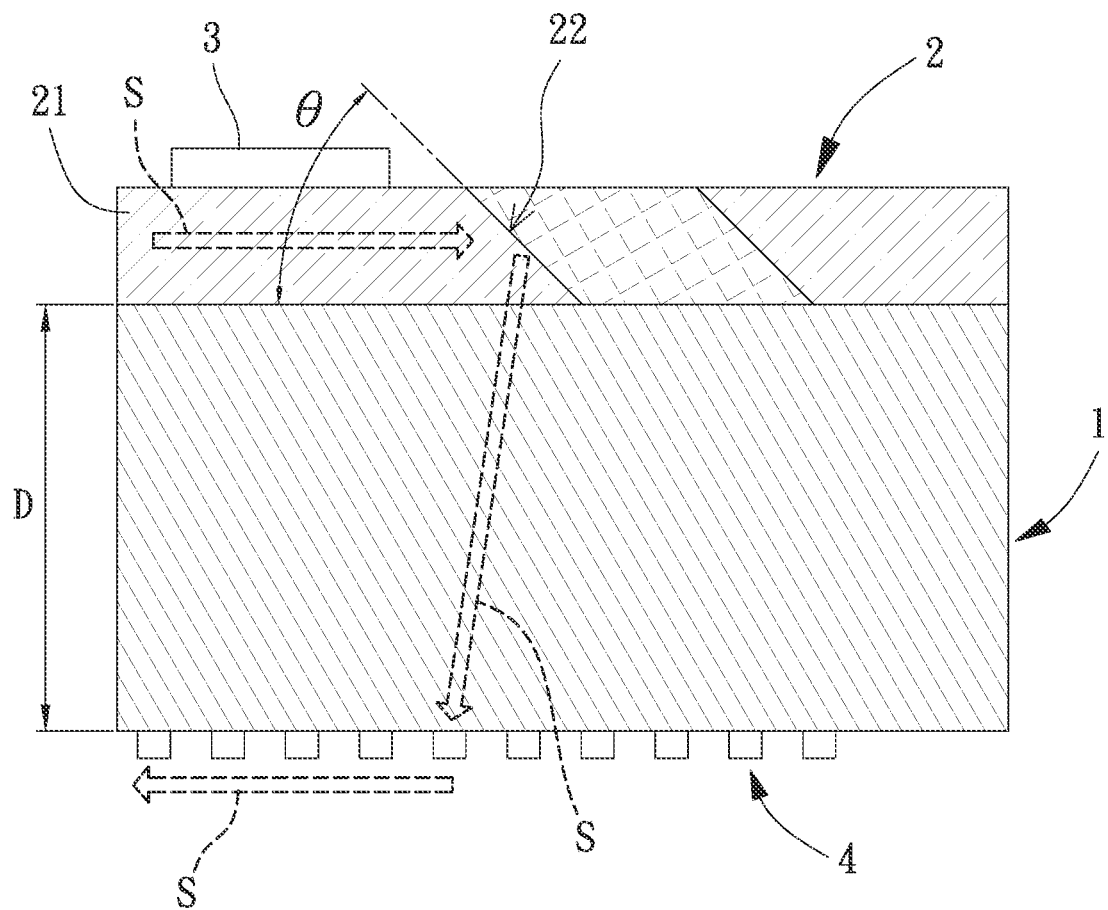
FIG. 3 is a cross-sectional view and shows a light path of a preferred embodiment of the invention.

Please refer to FIGS. 2 and 3, the luminescent layer 2 can generate or introduce the light signal S, the luminescent layer 2 has an optical waveguide 21, and an inclined mirror 22 at one end of the optical waveguide 21, which enables the light signal S to pass through the optical waveguide 21 and reflect on the inclined mirror 22. Further, there is an included angle θ between the inclined mirror 22 and a traveling direction of the light signal S in the optical waveguide 21. The included angle θ is preferably 46 to 54 degrees, which can prevent the light output by the optical waveguide 21 from being vertically reflected on the inclined mirror 22, so that the reflected light signal S can be incident on the substrate 1 obliquely. Thus, an anti-reflection effect to reduce optical loss can be achieved. In this embodiment, the inclined mirror 22 is a plane mirror. However, the inclined mirror 22 can also be a parabolic mirror such as having a convex or concave surface, so that the intensity of the reflected light can be adjusted through the characteristics of diffusing or focusing. However, the present invention is not limited in this regard.

The material of the luminescent layer 2 can be III-V compound semiconductor. By arranging a metal electrode 3 on the luminescent layer 2 and having the metal electrode 3 provide a current, the luminescent layer 2 can be used as a light source, such as a light-emitting diode, a superluminescent diode (SLD), a diode laser or other luminous elements. By adjusting the type, quantity and compound proportion of III-V elements contained in the material of the luminescent layer 2, the luminescent layer 2 can emit lights of different wavelengths, thereby achieving the function of selecting a suitable wavelength according to the transmission efficiency and availability of the integrated optical circuit.

After grinding and polishing a surface of the substrate 1 opposite to the luminescent layer 2, a coupling element 4 can be connected. The coupling element 4 can be a grating coupler. After the light signal S passes through the substrate 1, the light signal S is incident on the coupling element 4 at a specific angle, so that the light signal S is diffracted. When the angle of the light signal S incident on the grating and the grating period meet a coupling condition, the first-order diffraction light of the light signal S can be deflected into the silicon waveguide and other optical elements to achieve a stable optical mode. The thickness of the substrate 1 after grinding is a transmittance thickness D, which is the linear distance from the luminescent layer 2 to the coupling element 4. The transmittance thickness D is preferably 25 to 35 micrometers. When the light signal S passes through the substrate 1, the heat dissipation and the amplification mode can be increased to achieve the coupling condition of the grating.

Figure 4A:
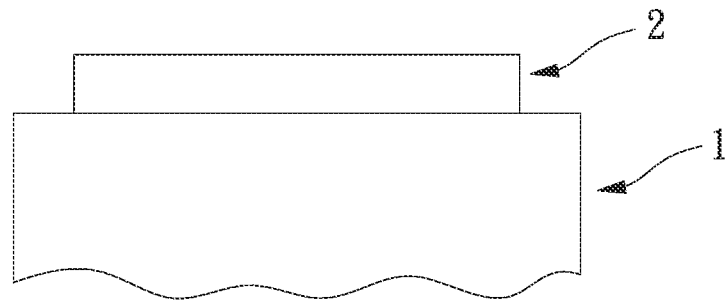
FIG. 4a is a diagrammatic view of a deposition process of a preferred embodiment of the invention.
Figure 4B:
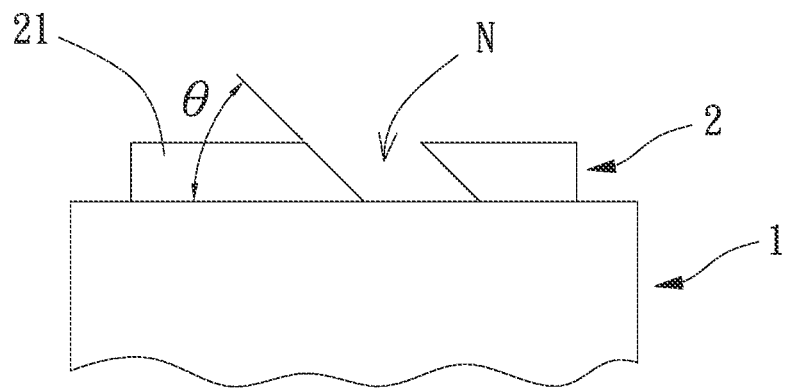
FIG. 4b is a diagrammatic view of an etching process of a preferred embodiment of the invention.
Figure 4C:
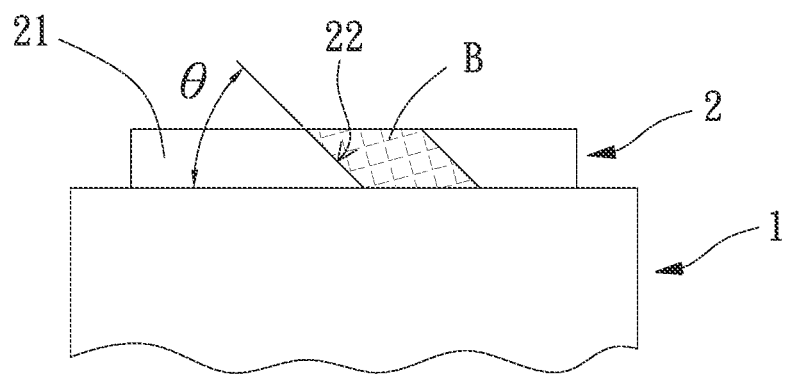
FIG. 4c is a diagrammatic view of a filling process of a preferred embodiment of the invention.
Figure 4D:
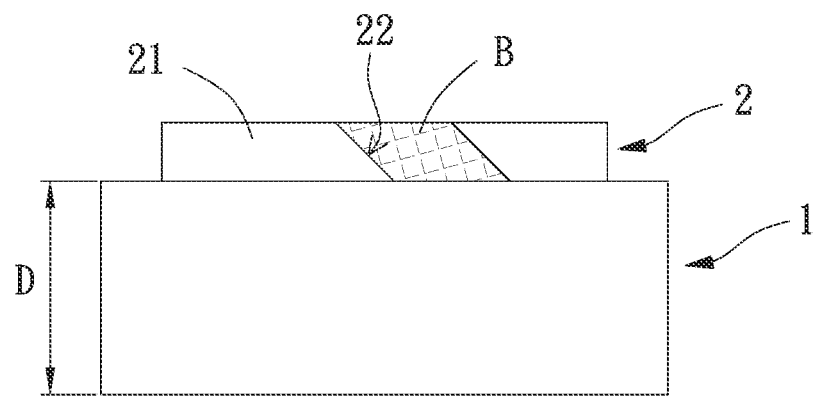
FIG. 4d is a diagrammatic view of a grinding process of a preferred embodiment of the invention.
Figure 4E:
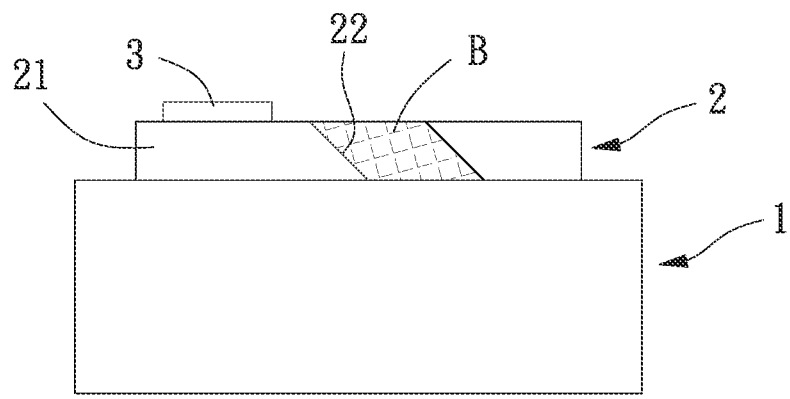
FIG. 4e is a diagrammatic view of a vapor deposition process of a preferred embodiment of the invention.
Figure 4F:
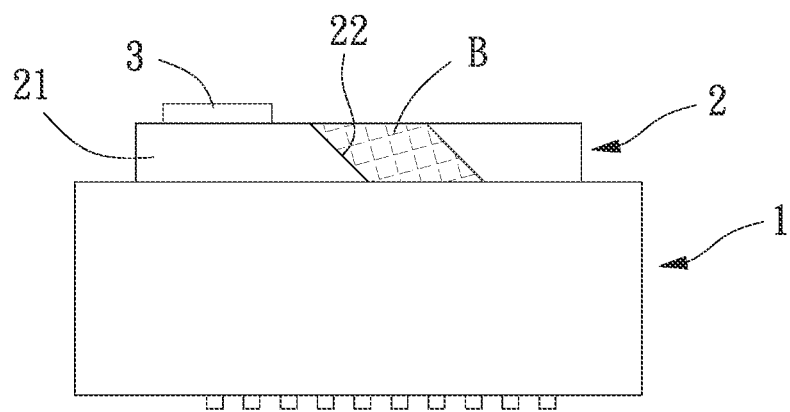
FIG. 4f is a diagram view of a bonding process of a preferred embodiment of the invention.

Please refer to FIGS. 4a to 4f, steps of a preferred embodiment of a method for manufacturing the optical mode converter of the invention is illustrated below. As shown in FIG. 4a, the luminescent layer 2 is formed on the substrate 1 by performing epitaxy. As shown in FIG. 4b, an optical waveguide 21 is formed on the luminescent layer 2 and a notch N is formed in the optical waveguide 21 by lithography and etching processes, so that the included angle θ is formed between an inclined plane of the notch N and a light transmission direction of the optical waveguide 21. As shown in FIG. 4c, the notch N is filled with a bonding material B, so that an inclined mirror 22 is formed at the notch N and a reflecting surface of the inclined mirror 22 faces the substrate 1. As shown in FIG. 4d, the substrate 1 is ground and polished to the transmittance thickness D. As shown in FIG. 4e, the metal electrode 3 is formed on the luminescent layer 2 by vapor deposition. As shown in FIG. 4f, the coupling element 4 is bonded to the surface of the substrate 1 opposite to the luminescent layer 2.

Please refer to FIGS. 4b and 4c. The above mentioned lithography and etching methods are carried out by first setting a position of the notch N on the optical waveguide 21 with a photoresist and a photomask, and then soaking in an etching solution for 15~25 times, each for 10 seconds. The etching solution can be a mixture of water, hydrochloric acid, hydrogen bromide and hydrogen peroxide in a ratio of 100:20:20:1. According to the lattice characteristics of III-V compound, the optical waveguide 21 can be etched to form an oblique angle at about 50 degrees as the notch N, and the notch N can be filled with the bonding material B to form the inclined mirror 22. The bonding material B can be benzocyclobutene (BCB), which has the characteristics of wafer bonding strength, chemical corrosion resistance and photosensitivity, and is suitable for optical interconnection. Referring to FIG. 4f again, the coupling element 4 can also be bonded to the substrate 1 by benzocyclobutene.

In summary, the optical mode converter and the manufacturing method thereof of the invention are carried out by forming the inclined mirror on the optical path. When the light signal moves to the inclined mirror, the light signal is reflected downward to the silicon waveguide to meet the coupling condition, thereby having the effect of enhancing the coupling effect and reducing light transmission loss. In addition, by controlling the angle of reflection through etching, precise processes such as cutting and calibration can be omitted, thereby having the effect of reducing the process difficulty and saving the production cost.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An optical mode converter, comprising:
   a substrate, wherein a thickness of the substrate is 25 to 35 micrometers; and
   a luminescent layer on the substrate, wherein the luminescent layer includes an optical waveguide and an inclined mirror at an end of the optical waveguide, and wherein a light signal passes through the optical waveguide and is reflected by the inclined mirror to penetrate into the substrate.

2. The optical mode converter as claimed in claim 1, wherein the luminescent layer is made of a III-V compound semiconductor material, and wherein a metal electrode is located on the luminescent layer, and the luminescent layer receives current through the metal electrode and generates the light signal.

3. The optical mode converter as claimed in claim 1, further comprising a coupling element located on a surface of the substrate opposite to the luminescent layer, and the light signal penetrates into the coupling element after passing through the substrate.

4. The optical mode converter as claimed in claim 1, wherein the inclined mirror is a parabolic mirror.

5. The optical mode converter as claimed in claim 1, wherein an included angle between the inclined mirror and the optical waveguide is 46 to 54 degrees.

6. A method for manufacturing an optical mode converter, comprising:
   forming a luminescent layer on a substrate;
   forming an optical waveguide on the luminescent layer and a notch in the optical waveguide by lithography and etching processes, wherein an included angle is formed between an inclined plane of the notch and a light transmission direction of the optical waveguide;
   filling the notch with a bonding material to form an inclined mirror at the notch, wherein a reflecting surface of the inclined mirror faces the substrate;
   grinding and polishing the substrate to a transmittance thickness; and
   forming a metal electrode on the luminescent layer by vapor deposition.

7. The method for manufacturing the optical mode converter as claimed in claim 6, wherein a coupling element is bonded to a surface of the substrate opposite to the luminescent layer.

8. The method for manufacturing the optical mode converter as claimed in claim 6, wherein the included angle is 46 to 54 degrees.

9. The method for manufacturing the optical mode converter as claimed in claim 6, wherein the transmittance thickness is 25 to 35 micrometers.

* * * * *